(12) United States Patent
Zhang et al.

(10) Patent No.: US 12,477,395 B2
(45) Date of Patent: Nov. 18, 2025

(54) WIRELESS COMMUNICATIONS BY DUAL SIM DEVICE

(71) Applicant: QUALCOMM Incorporated, San Diego, CA (US)

(72) Inventors: Hao Zhang, Shanghai (CN); Wei He, Shanghai (CN); Chaofeng Hui, Beijing (CN); Fojian Zhang, Shenzhen (CN); Jian Li, Shanghai (CN); Tianya Lin, Shanghai (CN); Bing Leng, Shanghai (CN); Yuankun Zhu, Shanghai (CN); Yi Liu, Shenzhen (CN)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 17/996,553

(22) PCT Filed: Jun. 10, 2020

(86) PCT No.: PCT/CN2020/095326
§ 371 (c)(1),
(2) Date: Oct. 19, 2022

(87) PCT Pub. No.: WO2021/248358
PCT Pub. Date: Dec. 16, 2021

(65) Prior Publication Data
US 2023/0284092 A1    Sep. 7, 2023

(51) Int. Cl.
*H04W 28/08*   (2023.01)
*H04W 8/18*    (2009.01)

(52) U.S. Cl.
CPC ......... *H04W 28/0846* (2020.05); *H04W 8/18* (2013.01)

(58) Field of Classification Search
CPC .................. H04W 28/0846; H04W 8/18
(Continued)

(56) References Cited

U.S. PATENT DOCUMENTS 11,057,865 B1 *  7/2021  Wong ............... H04W 68/005
11,172,406 B2 *  11/2021 Hampali ............ H04L 47/2491
(Continued)

FOREIGN PATENT DOCUMENTS

CN    103583067 A       2/2014
CN    108353271 A  *   7/2018   ............ H04L 12/14
(Continued)

OTHER PUBLICATIONS

Supplementary European Search Report—EP20939580—Search Authority—The Hague—Dec. 22, 2023.
(Continued)

*Primary Examiner* — Ahmad F. Matar
*Assistant Examiner* — Jirapon Tulop
(74) *Attorney, Agent, or Firm* — Patterson+ Sheridan, L.L.P.

(57) ABSTRACT

Aspects of the present disclosure provide a method for wireless communications by a user equipment (UE). The method generally includes receiving a request for a wireless connection from an application associated with one or more user equipment (UE) route selection policy (URSP) rules, attempting to establish the wireless connection for the application via a first subscriber identity module (SIM) according to one or more of the URSP rules associated with the application that are supported by the first SIM, and taking one or more actions to establish the wireless connection for the application via a second SIM if the attempt to establish the wireless connection for the application via the first SIM fails.

26 Claims, 7 Drawing Sheets

(58) Field of Classification Search
USPC .......................................................... 455/418
See application file for complete search history.

(56) References Cited

U.S. PATENT DOCUMENTS

| | | | |
|---|---|---|---|
| 2012/0135715 A1* | 5/2012 | Kang | ..................... H04W 4/16 |
| | | | 455/418 |
| 2015/0271805 A1 | 9/2015 | Mani et al. | |
| 2020/0162919 A1 | 5/2020 | Velev et al. | |
| 2022/0104117 A1* | 3/2022 | Xu | ........................ H04W 48/18 |
| 2023/0180309 A1 | 6/2023 | Zhang et al. | |

FOREIGN PATENT DOCUMENTS

| | | |
|---|---|---|
| CN | 110557798 A | 12/2019 |
| CN | 111034336 A | 4/2020 |
| EP | 3547747 A1 | 10/2019 |
| KR | 20200007606 A | 1/2020 |
| WO | 2020071536 A1 | 4/2020 |

OTHER PUBLICATIONS

Huawei, et al., "KI#1 KI#3, New Sol: N3GPP for MUSIM Service Concurrency," 3GPP TSG-WG SA2 Meeting #139E e-meeting, S2-2003975, Jun. 1-12, 2020, May 22, 2020 (May 22, 2020), 6 pages.
International Search Report and Written Opinion—PCT/CN2020/095326—ISA/EPO—Mar. 8, 2021.

\* cited by examiner ically after reading the section entitled "Detailed Description" one will understand how the features of this disclosure provide advantages that include improved performance of UEs operating with one or more SIMs.
WIRELESS COMMUNICATIONS BY DUAL SIM DEVICE

CROSS-REFERENCE TO RELATED APPLICATION(S)

This application is a national stage application under 35 U.S.C. 371 of PCT/CN2020/095326, filed Jun. 10, 2020, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for increasing the likelihood of successfully establishing a PDU session in dual subscriber identity module (dual SIM) scenarios.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved performance of UEs operating with one or more SIMs.

Certain aspects provide a method for wireless communications by a user-equipment (UE). The method generally includes receiving a request for a wireless connection from an application associated with one or more user equipment (UE) route selection policy (URSP) rules, attempting to establish the wireless connection for the application via a first subscriber identity module (SIM) according to one or more of the URSP rules associated with the application that are supported by the first SIM, and taking one or more actions to establish the wireless connection for the application via a second SIM if the attempt to establish the wireless connection for the application via the first SIM fails.

Certain aspects provide a user-equipment (UE). The UE generally includes means for receiving a request for a wireless connection from an application associated with one or more other user equipment (UE) route selection policy (URSP) rules, means for attempting to establish the wireless connection for the application via a first subscriber identity module (SIM) according to one or more of the URSP rules associated with the application that are supported by the first SIM, and means for taking one or more actions to establish the wireless connection for the application via a second SIM if the attempt to establish the wireless connection for the application via the first SIM fails.

Certain aspects provide a user-equipment (UE). The UE generally includes a receiver configured to receive a request for a wireless connection from an application associated with one or more other user equipment (UE) route selection policy (URSP) rules and a processing system configured to attempt to establish the wireless connection for the application via a first subscriber identity module (SIM) according to one or more of the URSP rules associated with the application that are supported by the first SIM and take one or more actions to establish the wireless connection for the application via a second SIM if the attempt to establish the wireless connection for the application via the first SIM fails.

Certain aspects provide an apparatus for wireless communications. The apparatus generally includes an interface configured to obtain a request for a wireless connection from an application associated with one or more user equipment (UE) route selection policy (URSP) rules and a processing system configured to attempt to establish the wireless connection for the application via a first subscriber identity module (SIM) according to one or more of the URSP rules associated with the application that are supported by the first SIM and take one or more actions to establish the wireless connection for the application via a second SIM if the attempt to establish the wireless connection for the application via the first SIM fails.

Certain aspects provide a computer-readable medium for wireless communications. The computer-readable medium generally includes instructions executable to obtain a request for a wireless connection from an application associated with one or more user equipment (UE) route selection policy (URSP) rules, attempt to establish the wireless connection for the application via a first subscriber identity module (SIM) according to one or more of the URSP rules associated with the application that are supported by the first SIM, and take one or more actions to establish the wireless connection for the application via a second SIM if the attempt to establish the wireless connection for the application via the first SIM fails.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

Figure 1:
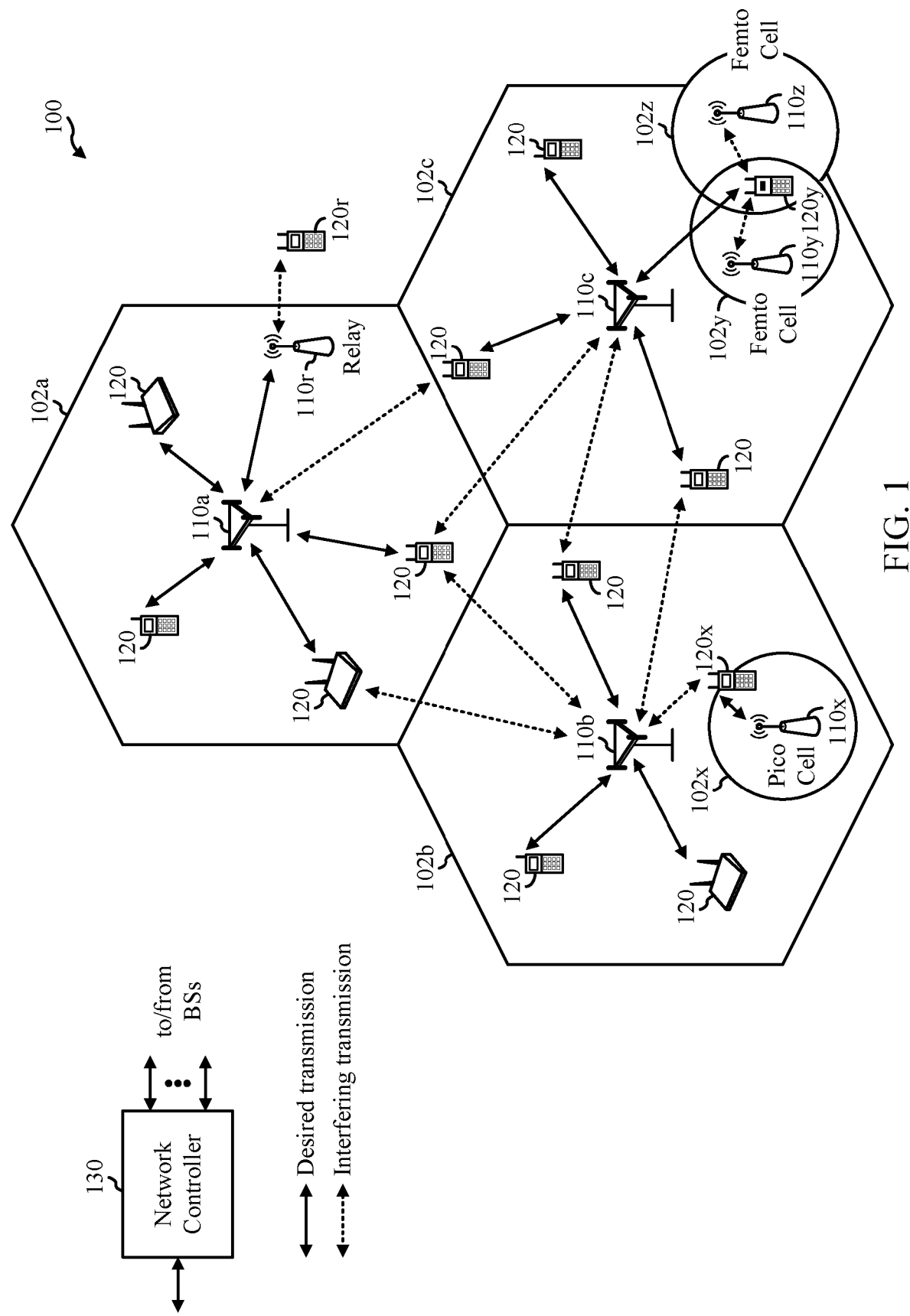
FIG. 1 is a block diagram conceptually illustrating an example telecommunications system, in accordance with certain aspects of the present disclosure.

The attached APPENDIX includes details of certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for mechanisms that may help increase the likelihood of successfully establishing a PDU session in dual subscriber identity module (dual SIM) scenarios. In some cases, a dual SIM dual standby (DSDS) UE receives a request from an application associated with one or more UE routing specific protocol (URSP) rules. After attempting to establish the connection with a first SIM as a default data subscriber (DDS), is rejected, the DSDS UE may check if a second SIM supports one of the URSP rules. If so, the DSDS UE may attempt to establish the connection via the second SIM.

The following description provides examples of prioritizing activities on SIM(s) of a UE in a communication system, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, a UE 120a may support (or operate with) multiple SIMs and may have a SIM controller 122a configured perform (or assist UE 120a in performing) operations 500 of FIG. 5. As will be described in greater detail below, operations 500 may help a DSDS UE establish a data connection to service an application associated with one or more URSP rules.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively.

A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
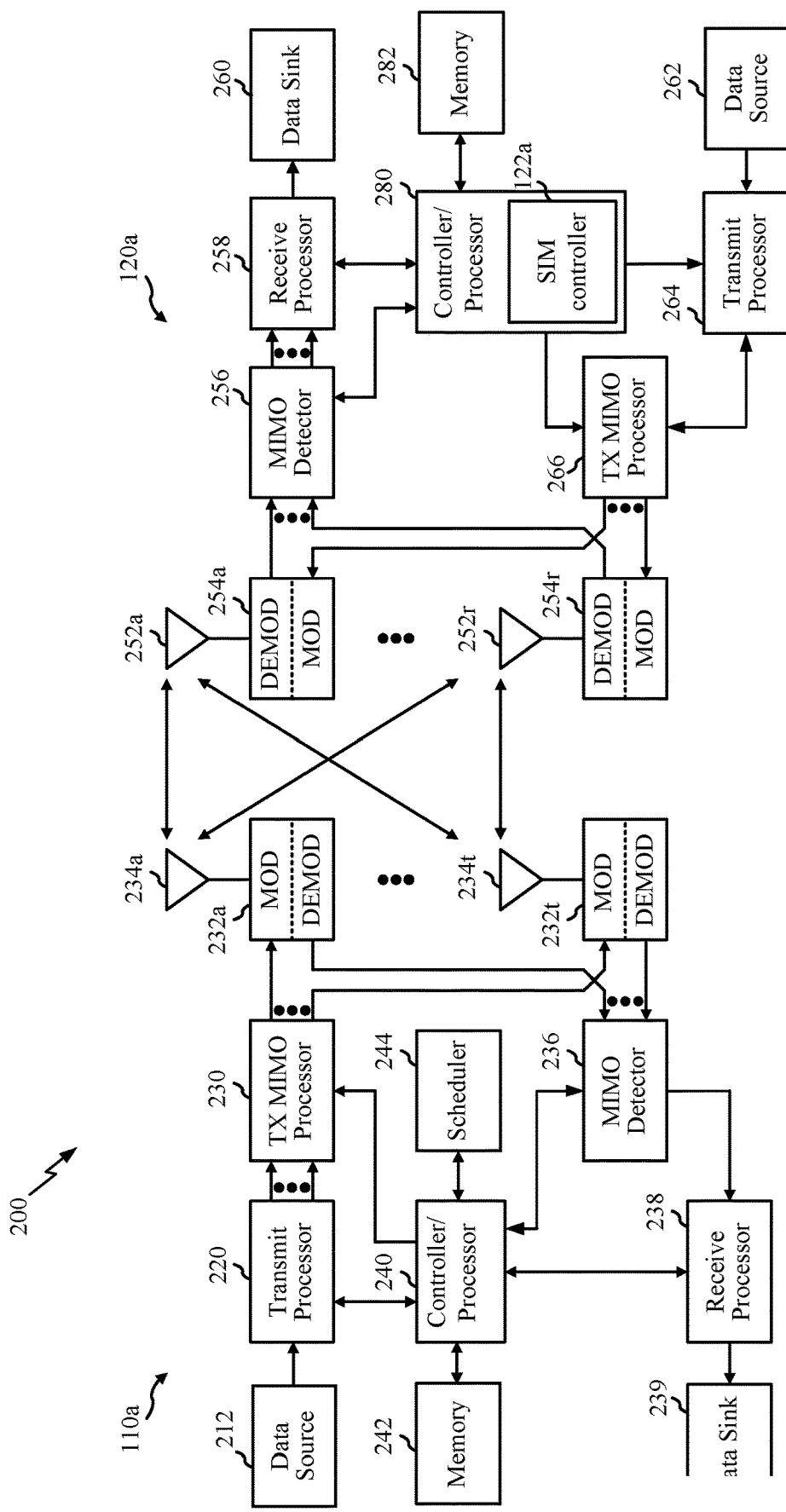
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 280 of the UE 120a has a SIM controller 122a, which is configured to implement one or more techniques described herein with reference to FIGS. 5-7.

In some examples, access to the air interface may be scheduled. A scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120a) to another subordinate entity (e.g., another UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations, resource reservations, and other parameters used for data transmissions, and the PSSCH may carry the data transmissions. The PSFCH may carry feedback such as CSI related to a sidelink channel quality. In some systems (e.g., NR Release 16), a two stage SCI may be supported. Two stage SCI may include a first stage SCI (SCI-1) and a second stage SCI (e.g., SCI-2). SCI-1 may include resource reservation and allocation information, information that can be used to decode SCI-2. etc. SCI-2 may include information that can be used to decode data and to determine whether the UE is an intended recipient of the transmission. SCI-1 and/or SCI-2 may be transmitted over PSCCH.

NR concurrent radio-access technology (RAT) operation generally refers to operating multiple simultaneous active connections with at least one connection being on NR. For example, the two connections may involve LTE and NR connections, or both NR connections. Multi-SIM devices are able to connect to multiple networks independently without network awareness. Different UE behaviors may occur based on different implementations like dual-SIM dual active (DSDA) or dual-SIM dual standby (DSDS). DSDS generally refers to a dual-SIM deployment where the two SIM cards of the UE may be unable to simultaneously generate traffic. DSDA on the other hand refers to a dual-SIM deployment where both SIM cards of the UE may be active at the same time. As used herein, a SIM generally refers to both virtual and hardware implementations of a SIM. In other words, each SIM may be implemented using hardware (e.g., a physical SIM card) on the multi-SIM device, or implemented virtually using a remote database.

Dual SIM receivers allow the different SIMs to support a variety of different combination options. For example, dual-SIM (DSIM) devices could support the following:
  SA-NR+SA-NR: both SIMs could support standalone (SA) NR (SA-NR);
  NSA-NR+LTE: one SIM supports non-standalone (NSA) while another SIM supports LTE;
  LTE+LTE: both SIMs support LTE;
  LTE+W: one SIM supports LTE, the other supports wideband CDMA; or any other combination (X RAT+X RAT both SIMs the same RAT or X RAT+Y RAT the SIMs support different RATs).

Figure 3:
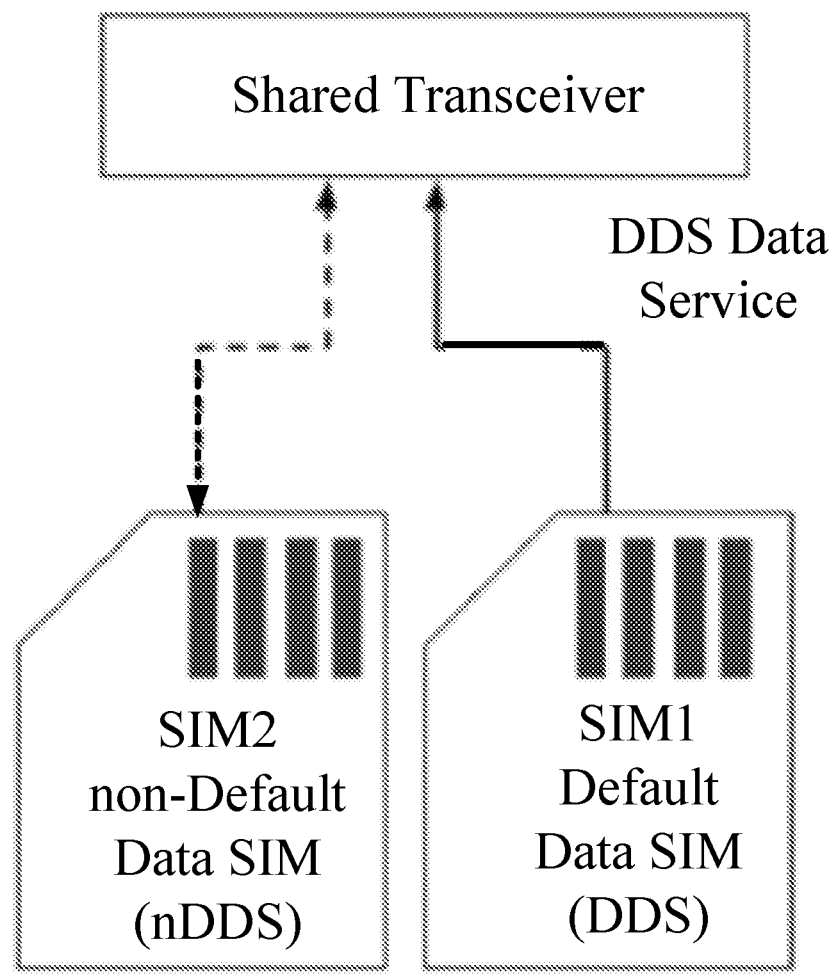
FIG. 3 illustrates an example multi-SIM deployment for a UE, in accordance with certain aspects of the present disclosure.

In some cases, in a multi-SIM deployment, each SIM of the UE can belong to the same network carrier. For example, two or more SIMs (also referred to herein as subscribers or SUBs) belonging to the same operator can be in the following modes:
  (1) Idle+Idle: 2 or more SUBs in Idle camp to the same cell
  (2) Connected+Idle: 1 SUB in Idle and 1 Sub Connected camp to the same cell FIG. 3 illustrates an example multi-SIM deployment, in which multiple SIMs share a single radio resource. For example, sharing the same radio resource, one SIM/subscriber module (SUB) may register with a 5G/NR radio access network (RAN), while another may register with LTE.

In such cases, two subscriber modules (SUBs) share the radio in the time domain, each accessing the shared radio resource at different times. Sharing a single radio resource by multiple SUBs may cause issues.

For example, as illustrated in FIG. 3, when one SUB, such as a data delivery SIM (DDS), is running time sensitive services, such as online gaming with high definition (HD) video and another SUB, such as a non-DDS (nDDS) needs to access the shared radio resource to monitor for paging.

Example DDS Switch when Connection Request is Rejected and N-DDS Matches a URSP Rule In some cases, in a DSDS UE, an application may request a new data connection, but the request may be rejected by the network.

Figure 4:
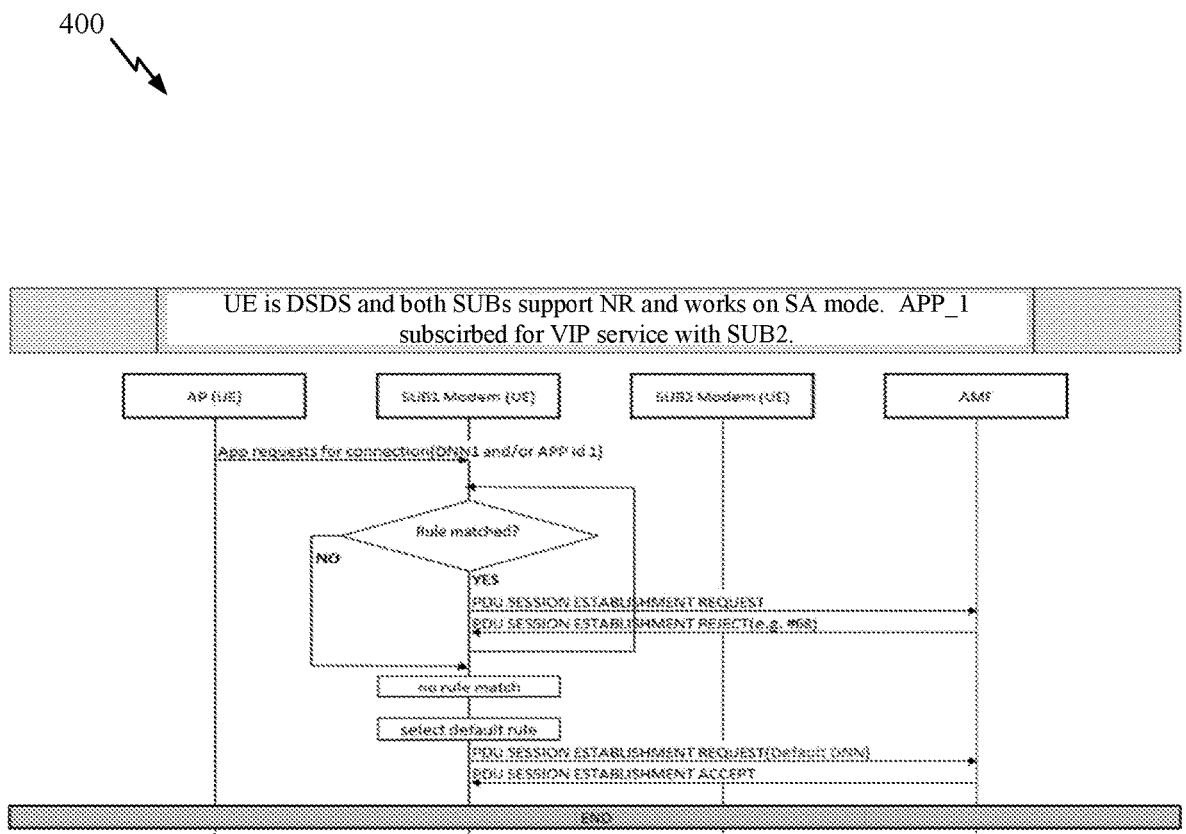
FIG. 4 is a flow diagram illustrating example operations for wireless communication by a UE, in accordance with certain aspects of the present disclosure.

For example, as illustrated in FIG. 4, a DSDS UE may have two SUBs (SUB1 and SUB2) that both support NR and work in a standalone (SA) mode, with an application (APP_1) subscribed for enhanced (e.g., "VIP") service with SUB2. The example assumes SUB1 is the DDS.

As illustrated, the application APP_1 may request a connection, specifying a particular data network name (DNN) or an application ID (or both) that may be listed in one or more UE route specific protocol (URSP) rules. In this context, URSP generally refers to a set of rules that enable a UE to determine how a certain application should be handled in the context of an existing or new PDU session, for example, specifying a route selection descriptor (RSD).

In a conventional scenario, the UE will search a DDS (SUB1 in this example), for a match with a URSP rule for the requesting application and request a PDU session if a match is found. If the network rejects each request (for each matching URSP rule supported by the DDS SUB1), the UE will request a PDU session with a default rule (e.g., specifying a match all Traffic Descriptor).

In such a case, only a basic level service may be provided even though the requesting application may have subscribed for a dedicated service with the non-DDS (SUB2 in this example). Thus, the user will not be able to get the best service, despite the subscription. This scenario may be more likely to happen when both SUBs (SUB1 and SUB2) belong to the same operator.

Aspects of the present disclosure, however, may help address this issue by attempting to establish a connection on a non-DDS sub, when connection requests for all matched rules in URSP on the DDS SUB is rejected by the network before attempting to connect with a default rule.

Figure 5:
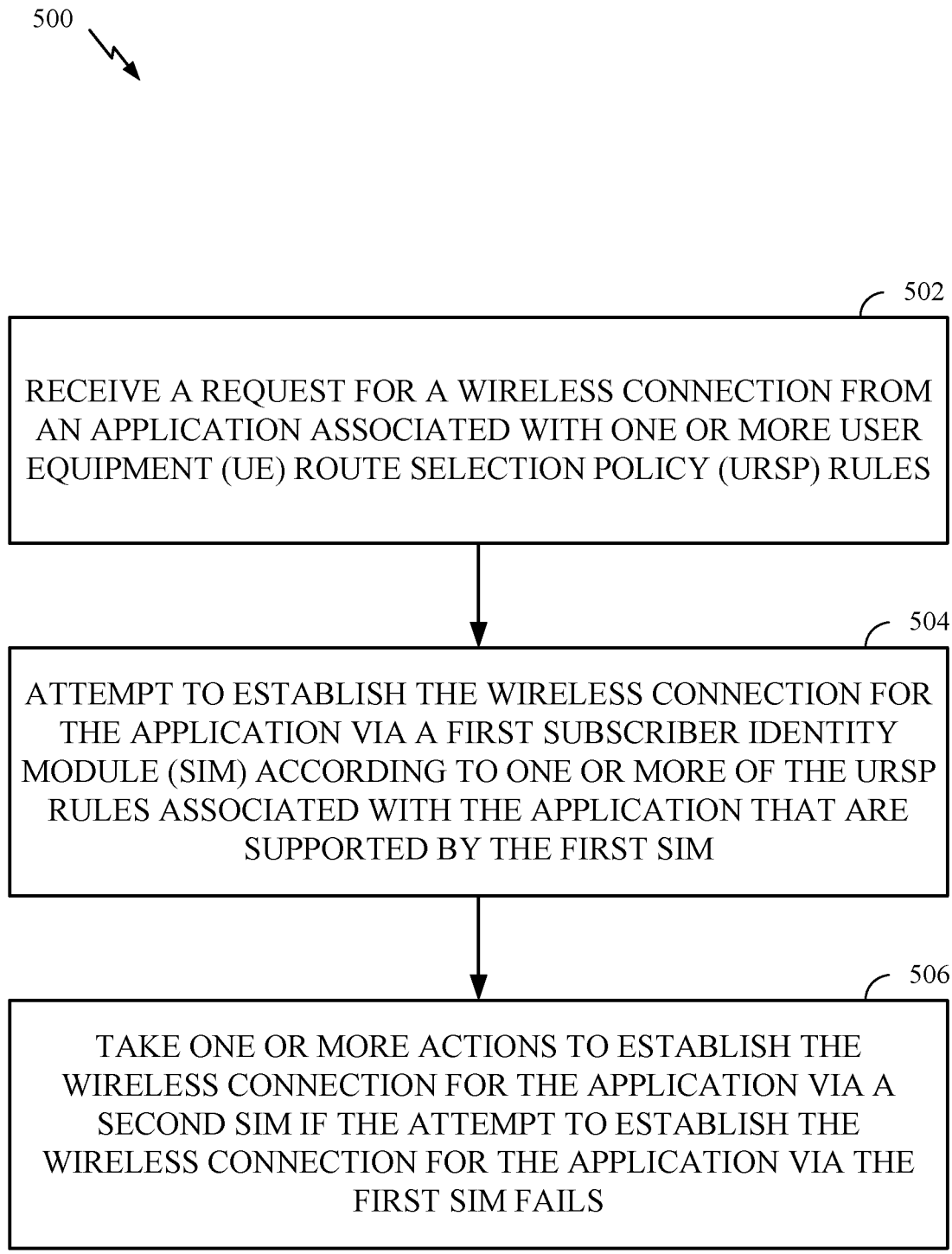
FIG. 5 is a flow diagram illustrating example operations for wireless communication by a UE, in accordance with certain aspects of the present disclosure.

FIG. 5 illustrates example operations 500 for wireless communication, in accordance with certain aspects of the present disclosure. The operations 500 may be performed by a UE (e.g., UE 120a in the wireless communication network 100) equipped with multiple SIMs (e.g., corresponding to SUB1 and SUB2).

Operations 500 begin, at 502, by receiving a request for a wireless connection from an application associated with one or more user equipment (UE) route selection policy (URSP) rules. At 504, the UE attempts to establish the wireless connection for the application via a first subscriber identity module (SIM) according to one or more of the URSP rules associated with the application that are supported by the first SIM. At 506, the UE takes one or more actions to establish the wireless connection for the application via a second SIM if the attempt to establish the wireless connection for the application via the first SIM fails.

Figure 6:
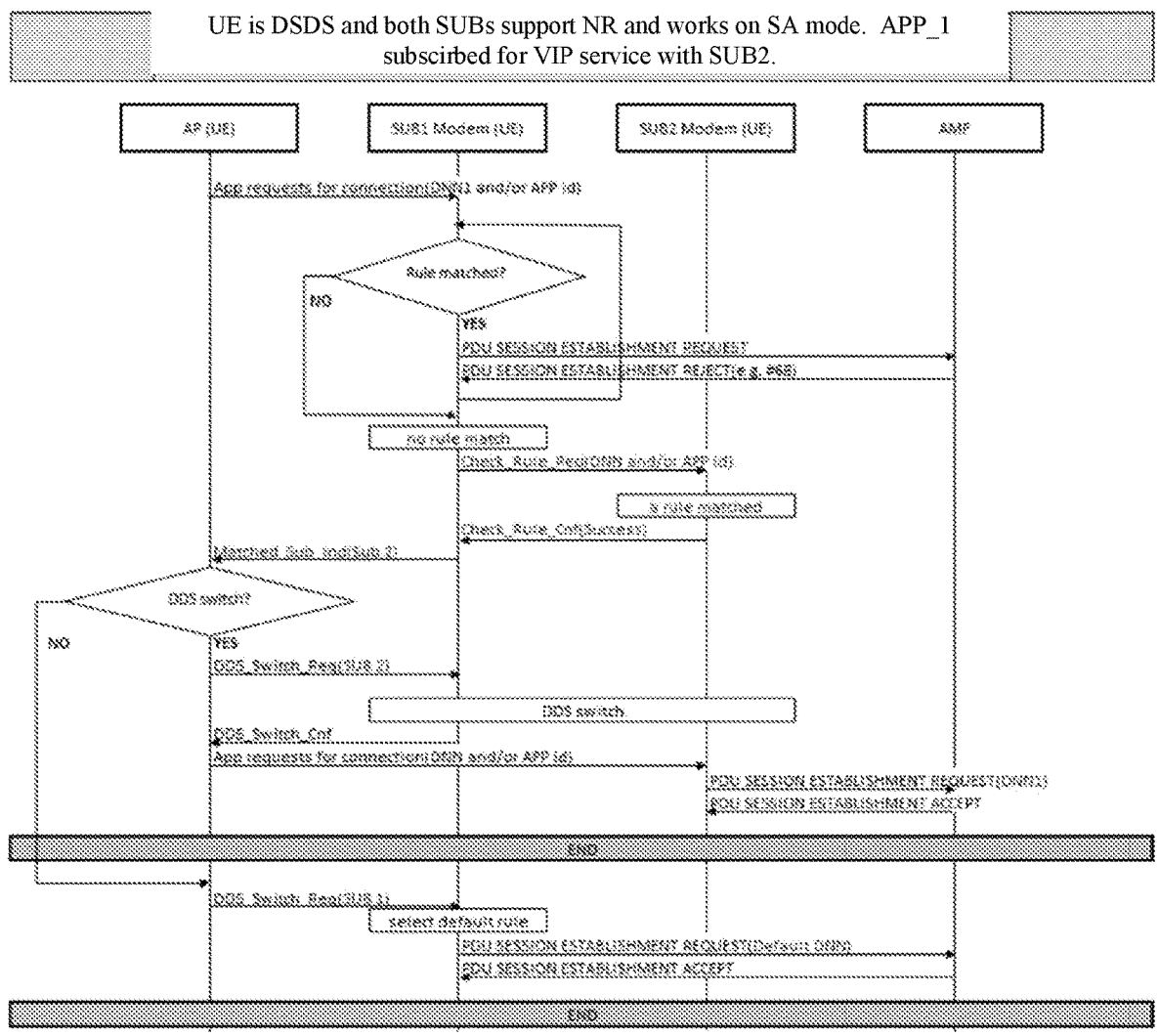
FIG. 6 is another flow diagram illustrating example operations for wireless communication by a UE, in accordance with certain aspects of the present disclosure.
Figure 7:
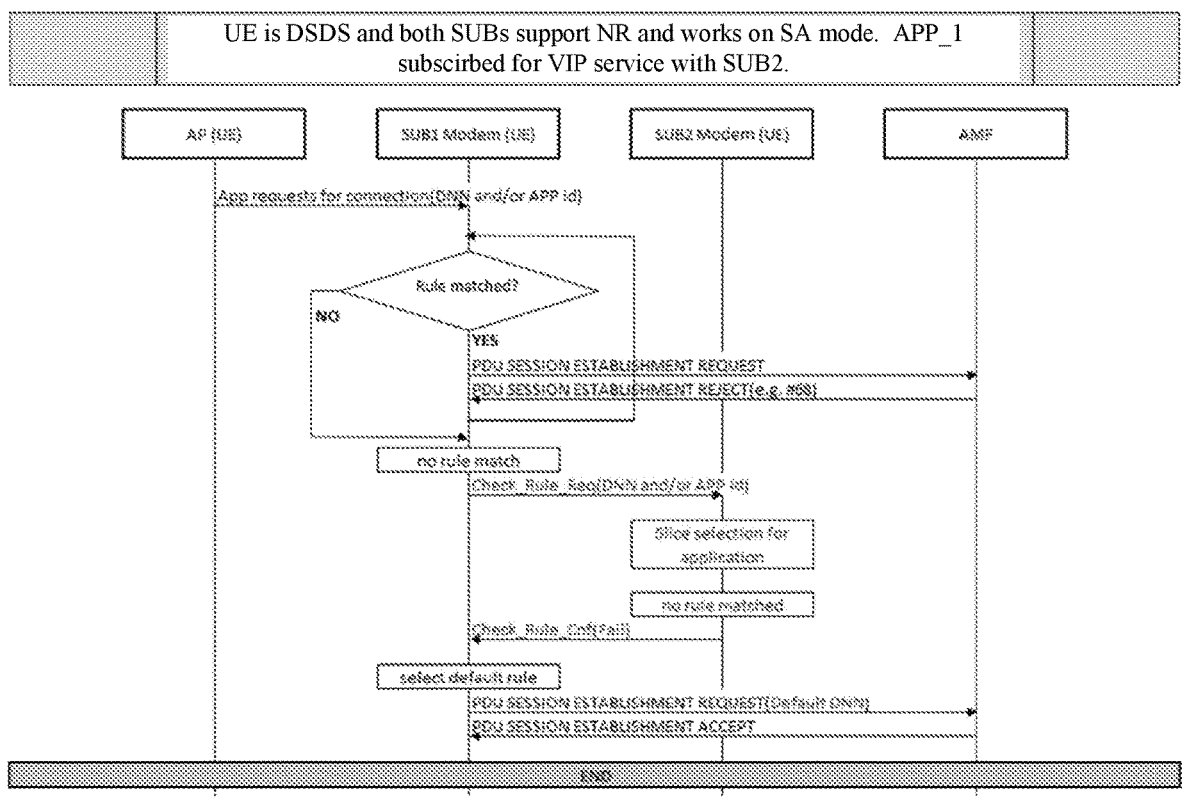
FIG. 7 is another flow diagram illustrating example operations for wireless communication by a UE, in accordance with certain aspects of the present disclosure.

Operations 500 may be understood with reference to call flow diagrams shown in FIGS. 6 and 7. Like the example in FIG. 4, the examples shown in FIGS. 6 and 7 also assume SUB 1 is initially the DDS when APP_1 requests a network connection.

As illustrated in FIG. 6, when all matched rules in URSP on the DDS SUB are rejected by the network, before connecting with a default rule (e.g., selecting a "match all" Traffic Descriptor), the UE may check if the other SUB (nDDS SUB 2 in this case) has a URSP rule match for APP_1. If a matched rule is found, the SUB2 modem may indicate to the user that to get best service for this application, the DDS should be switched (from SUB 1 to SUB 2).

According to the example solution shown in FIG. 6, the user may be prompted to switch DDS from SUB1 to SUB2. If the user requests the DDS switch, the UE will change the DDS to SUB 2 and send the PDU session PDU SESSION ESTABLISHMENT REQUEST with parameters that best meet the request of application (e.g., DNN, PDU session type, Session and Service Continuity (SSC) mode, etc.). In this case, the user may be able to receive the best service for the specific application.

If, on the other hand, the user does not request the DDS switch, the UE may select the default rule for this APP. In this case, the UE may send the PDU SESSION ESTABLISHMENT REQUEST with a default DNN and, like the case of FIG. 4, the UE will receive only a basic level of service. In some cases, an application may automatically select a DDS switch (e.g., if certain conditions are met and the network has rejected PDU Session establishment requests with all matching URSP rules of the current DDS).

According to another example solution shown in FIG. 7, in some cases, if no matched rules are found when checking the nDDS (SUB 2), the UE may send the PDU SESSION ESTABLISHMENT REQUEST via SUB 2, with the default rule (e.g., with the "match all" Traffic Descriptor selected).

As described herein, one potential benefit of the techniques described herein is that a user may be able to more often receive the best service for a specific application, by attempting a network connection via an nDDS when the UE fails to establish a connection with a URSP rule match on the DDS and the UE finds a URSP rule match with the DDS.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA, cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS), LTE and LTE-A are releases of UMTS that use E-UTRA, UTRA, E-UTRA, UMTS, LTE, LTE-A and GSM are described in documents from an organization named "3rd Generation Partnership Project" (3GPP), cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a small bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC- FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a–b, a–c, b–c, and a–b–c, as well as any combination with multiples of the same element (e.g., a–a, a–a–a, a–a–b, a–a–c, a–b–b, a–c–c, b–b, b–b–b, b–b–c, c–c, and c–c–c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120*a* and/or processors 220, 230, 238, and/or controller/processor 240 of the BS 110*a* shown in FIG. 2 may be configured to perform operations shown in FIGS. 5, 6, and/or 7.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for attempting, means for using, means for taking one or more actions, means for switching and means for providing may include a processing system, which may include one or more processors, such as processors 258, 264 and 266, and/or controller/processor 280 of the UE 120*a* and/or processors 220, 230, 238, and/or controller/processor 240 of the BS 110*a* shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5, 6, and/or 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
receiving a request for a wireless connection from an application associated with one or more user equipment (UE) route selection policy (URSP) rules;
attempting to establish the wireless connection for the application via a first subscriber identity module (SIM) according to the one or more URSP rules associated with the application that are supported by the first SIM; and
taking one or more actions to establish the wireless connection for the application via a second SIM when the attempt to establish the wireless connection for the application via the first SIM fails, wherein taking the one or more actions includes attempting to establish the wireless connection via the second SIM according to a default rule when the second SIM does not support any of the one or more URSP rules associated with the application.

2. The method of claim 1, wherein the wireless connection comprises a protocol data unit (PDU) session.

3. The method of claim 1, wherein the application involves subscribed services with the second SIM.

4. The method of claim 1, wherein:
the request for the wireless connection indicates at least one of a data network name (DNN) or an application ID; and
the method further comprises using at least one of the DNN or application ID to check for a match between one or more URSP rules supported by the first SIM or the second SIM with the one or more URSP rules associated with the application.

5. The method of claim 1, wherein the one or more actions comprise:
checking to see if the second SIM supports one or more of the URSP rules associated with the application; and
if the second SIM supports one or more of the URSP rules associated with the application, attempting to establish the wireless connection for the application via the second SIM according to one or more of the URSP rules associated with the application that are supported by the second SIM.

6. The method of claim 5, further comprising:
if the second SIM supports one or more of the URSP rules associated with the application, switching from using the first SIM as a default data subscriber (DDS) to using the second SIM as the DDS.

7. The method of claim 6, further comprising:
providing an indication to a user that the second SIM provides better service for the application than the first SIM, wherein:
the switch from using the first SIM as the DDS to using the second SIM as the DDS occurs if the user selects a DDS switch.

8. The method of claim 7, further comprising attempting to establish the wireless connection via the first SIM according to the default rule if the user does not select the DDS switch.

9. A user equipment (UE), comprising:
means for receiving a request for a wireless connection from an application associated with one or more user equipment (UE) route selection policy (URSP) rules;
means for attempting to establish the wireless connection for the application via a first subscriber identity module (SIM) according to the one or more URSP rules associated with the application that are supported by the first SIM; and
means for taking one or more actions to establish the wireless connection for the application via a second SIM when the attempt to establish the wireless connection for the application via the first SIM fails, wherein means for taking the one or more actions includes means for attempting to establish the wireless connection via the second SIM according to a default rule when the second SIM does not support any of the one or more URSP rules associated with the application.

10. The UE of claim 9, wherein the wireless connection comprises a protocol data unit (PDU) session.

11. The UE of claim 9, wherein the application involves subscribed services with the second SIM.

12. The UE of claim 9, wherein:
the request for the wireless connection indicates at least one of a data network name (DNN) or an application ID; and
the UE further comprises means for using at least one of the DNN or application ID to check for a match between one or more URSP rules supported by the first SIM or the second SIM with the one or more URSP rules associated with the application.

13. The UE of claim 9, wherein the one or more actions comprise:
checking to see if the second SIM supports one or more of the URSP rules associated with the application; and
if the second SIM supports one or more of the URSP rules associated with the application, attempting to establish the wireless connection for the application via the second SIM according to one or more of the URSP rules associated with the application that are supported by the second SIM.

14. The UE of claim 13, further comprising:
if the second SIM supports one or more of the URSP rules associated with the application, means for switching from using the first SIM as a default data subscriber (DDS) to using the second SIM as the DDS.

15. The UE of claim 14, further comprising:
means for providing an indication to a user that the second SIM provides better service for the application than the first SIM, wherein:
the switch from using the first SIM as the DDS to using the second SIM as the DDS occurs if the user selects a DDS switch.

16. The UE of claim 15, further comprising means for attempting to establish the wireless connection via the first SIM according to the default rule if the user does not select the DDS switch.

17. A user equipment (UE), comprising:
a receiver configured to receive a request for a wireless connection from an application associated with one or more user equipment (UE) route selection policy (URSP) rules; and
a processing system configured to:
attempt to establish the wireless connection for the application via a first subscriber identity module (SIM) according to the one or more URSP rules associated with the application that are supported by the first SIM; and
take one or more actions to establish the wireless connection for the application via a second SIM when the attempt to establish the wireless connection for the application via the first SIM fails, wherein, to take the one or more actions, the processing system is configured to attempt to establish the wireless connection via the second SIM according to a default rule when the second SIM does not support any of the one or more URSP rules associated with the application.

18. The UE of claim 17, wherein the wireless connection comprises a protocol data unit (PDU) session.

19. The UE of claim 17, wherein the application involves subscribed services with the second SIM.

20. The UE of claim 17, wherein:
the request for the wireless connection indicates at least one of a data network name (DNN) or an application ID; and
the processing system is further configured to use at least one of the DNN or application ID to check for a match between one or more URSP rules supported by the first SIM or the second SIM with the one or more URSP rules associated with the application.

21. The UE of claim 17, wherein the one or more actions comprise:
checking to see if the second SIM supports one or more of the URSP rules associated with the application; and
if the second SIM supports one or more of the URSP rules associated with the application, attempting to establish the wireless connection for the application via the second SIM according to one or more of the URSP rules associated with the application that are supported by the second SIM.

22. The UE of claim 21, wherein:
if the second SIM supports one or more of the URSP rules associated with the application, the processing system is further configured to switch from using the first SIM as a default data subscriber (DDS) to using the second SIM as the DDS.

23. The UE of claim 22, wherein:
the processing system is further configured to provide an indication to a user that the second SIM provides better service for the application than the first SIM, wherein:
the switch from using the first SIM as the DDS to using the second SIM as the DDS occurs if the user selects a DDS switch.

24. The UE of claim 23, wherein the processing system is further configured to attempt to establish the wireless connection via the first SIM according to the default rule when the user does not select the DDS switch.

25. An apparatus for wireless communications, comprising:
an interface configured to obtain a request for a wireless connection from an application associated with one or more user equipment (UE) route selection policy (URSP) rules; and
a processing system configured to:
attempt to establish the wireless connection for the application via a first subscriber identity module (SIM) according to the one or more URSP rules associated with the application that are supported by the first SIM; and
take one or more actions to establish the wireless connection for the application via a second SIM when the attempt to establish the wireless connection for the application via the first SIM fails, wherein, to take the one or more actions, the processing system is configured to attempt to establish the wireless connection via the second SIM according to a default rule when the second SIM does not support any of the one or more URSP rules associated with the application.

26. A non-transitory computer-readable medium for wireless communications, comprising instructions executable to:
obtain a request for a wireless connection from an application associated with one or more user equipment (UE) route selection policy (URSP) rules;
attempt to establish the wireless connection for the application via a first subscriber identity module (SIM) according to one or more of the URSP rules associated with the application that are supported by the first SIM; and
take one or more actions to establish the wireless connection for the application via a second SIM when the attempt to establish the wireless connection for the application via the first SIM fails, wherein to take the one or more actions, the instructions are further executable to attempt to establish the wireless connection via the second SIM according to a default rule when the second SIM does not support any of the one or more URSP rules associated with the application.

* * * * *